United States Patent

[11] 3,620,547

| [72] | Inventor | Milton J. Vaverek<br>4420 Joslyn Road, Pontiac, Mich. 48055 |
|---|---|---|
| [21] | Appl. No. | 852,735 |
| [22] | Filed | Aug. 25, 1969 |
| [45] | Patented | Nov. 16, 1971 |

[54] SCOOTER
8 Claims, 8 Drawing Figs.

[52] U.S. Cl. .................................................. 280/84.04 A
[51] Int. Cl. .................................................. B62b 3/00
[50] Field of Search .......................................... 280/87.04, 87.04 A, 239, 267, 263

[56] References Cited
UNITED STATES PATENTS

| 2,696,387 | 12/1954 | Nordin | 280/263 |
| 2,474,946 | 7/1949 | Kinslow | 280/87.04 A |
| 635,896 | 10/1899 | Miller | 280/239 |
| 305,690 | 9/1884 | Humber | 280/239 |
| 3,389,922 | 6/1968 | Eastin | 280/11.28 |

Primary Examiner—Benjamin Hersh
Assistant Examiner—Robert R. Song
Attorney—Whittemore, Hulbert & Belknap ABSTRACT: The scooter is designed basically to be operated downhill using gravity as the motive power. The front wheel is turned conventionally by means of a steering mechanism including handlebars. The rear wheel turns automatically upon tilting of the scooter frame. The pivotal axis of the rear wheel is inclined upwardly and forwardly and theoretically intersects the ground at a point forwardly of the point where the rear wheel touches the ground. This geometry results in the rear wheel turning in the same direction as the frame is tilted.

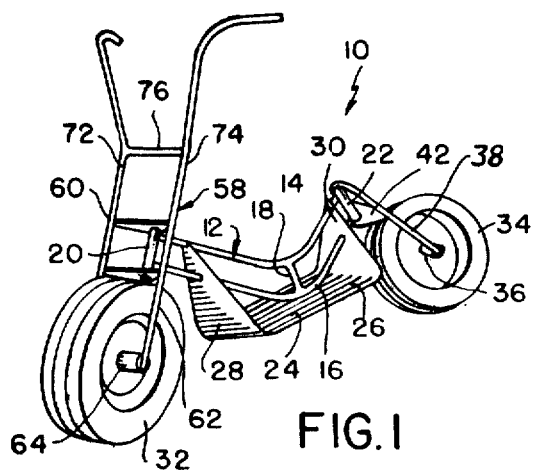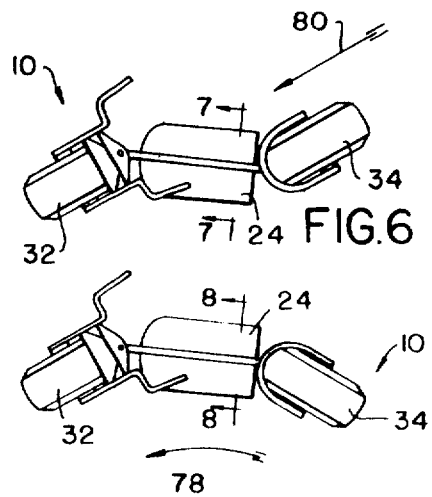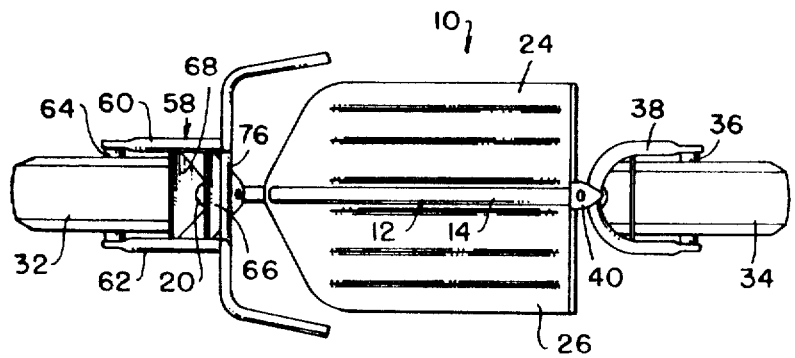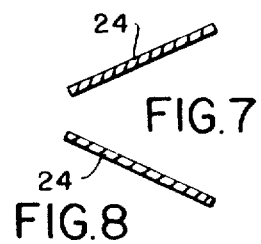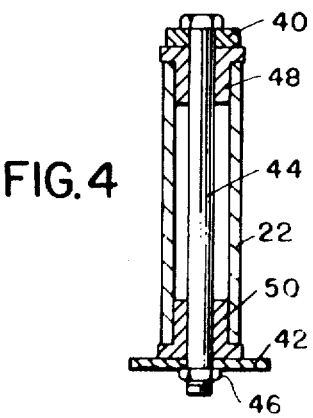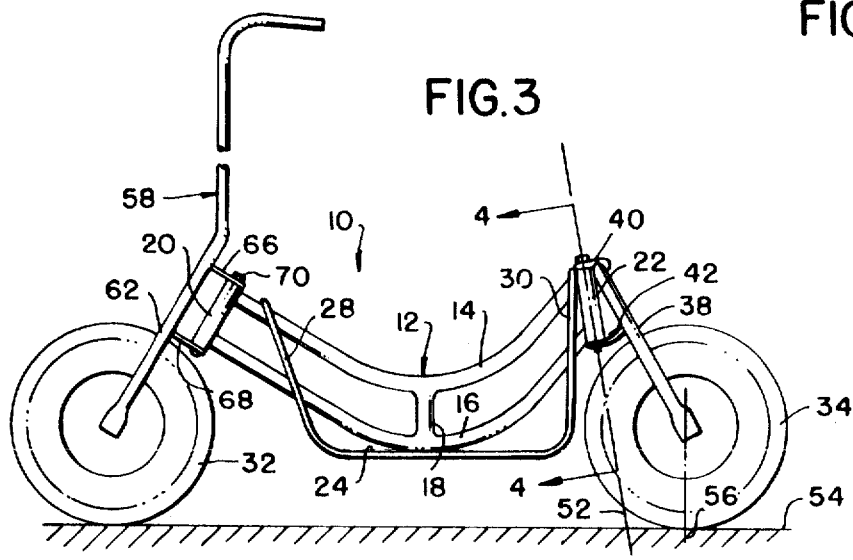
INVENTOR
MILTON J. VAVEREK 3,620,547

SCOOTER

BACKGROUND OF THE INVENTION

Scooters of the two-wheel type have been in use for a considerable number of years. The conventional scooter includes a platform for the operator to either stand on or use as a leverage point for one foot while the other foot engages the ground to push the scooter along. The front wheel of the scooter has been turnable by means of a handlebar arrangement to permit steering of the scooter. The rear wheel of such scooters has been fixed and not capable of being pivoted.

Sport-type scooters or wheeled vehicles of two and four wheel types wherein both the front and rear wheel systems may be turned have been proposed. In such proposals, means have been provided for turning the wheels upon tilting of the frame. In such mechanisms the wheels have been designed to track so that the front and rear wheels will turn in opposite directions to describe a turning arc. In order that the front and rear axles turn properly for such tracking, it has been thought imperative that the inclination of the pivot axes converge downwardly towards a point of intersection beneath the vehicle, that is, that the front axis be inclined forwardly with respect to the vehicle and the rear axis be inclined rearwardly with respect to the vehicle. Vehicles of this type have been capable of only limited turning arcs and turning of the front and rear wheels have been interdependent thus obviating turning situations which are possible when the front and rear wheels turn independently.

In accordance with the present invention, the front wheel is turned manually in any direction desired by the operator. The rear wheel is turned, as the result of tilting of the scooter frame, in a direction which is the same as the direction in which the frame is tilted. With this arrangement, various turning configurations are possible. For example, the scooter may be driven sidewardly in either direction or it may be turned in an arc or a combination thereof. When turned in an arc, very sharp turns are possible while still retaining stability.

The scooter of the present invention is eminently satisfactory as a sport device. For example, the scooter may be used to simulate the slalom tactics utilized in snow-skiing. Such tactics require numerous quick turns in either direction and sideward sliding as the skier descends a slope. In practice, the very same slopes which are utilized by wintertime skiers may be utilized in very similar fashion by operators of scooters of the present invention. This is advantageous in that it permits recreational use of expensive ski slopes and attendant lodging facilities at a time when ordinary snow-skiing is impossible.

SUMMARY OF THE INVENTION

The scooter comprises a frame which includes structure to support an operator. Front and rear wheel support structures are provided. Front ground-engaging wheel means are rotatably mounted on the front wheel support structure while rear ground-engaging wheel means are rotatably mounted on the rear wheel support structure. First means are provided for pivotally mounting the front wheel support structure on the frame. Grippable means are provided for manually turning the front wheel support structure. Second means are provided to pivotally mount the rear wheel support structure on the frame. The pivotal axis of the second means is inclined upwardly and forwardly and when theoretically extended, intersects the ground surface at or in front of the point of contact of the rear wheel means with the ground surface to the end that the rear wheel means will turn in response to sideward tilting of the pivotal axis of the second means and in the same direction as said axis is tilted.

IN THE DRAWING

FIG. 1 is a view in perspective of one embodiment of the scooter of the present invention;

FIG. 2 is a top plan view of the scooter of FIG. 1;

FIG. 3 is a side elevational view of the scooter of FIG. 1;

FIG. 4 is a sectional view taken substantially along the line 4—4 of FIG. 3 looking in the direction of the arrows;

FIG. 5 is a top plan view of the scooter illustrating turning of the rear wheel to the right;

FIG. 6 is a top plan view of the scooter illustrating turning of the rear wheel to the left;

FIG. 7 is a sectional view taken substantially along the line 7—7 of H FIG. 6 looking in the direction of the arrows; and FIG. 8 is a sectional view taken substantially along the line 8—8 of FIG. 5 looking in the direction of the arrows.

Referring to the figures, particularly FIGS. 1–3, it will be noted that the scooter 10 includes a frame 12 having a pair of vertically spaced-apart, longitudinally extending curved members 14, 16. The central portions of these members are interconnected by a vertical support bar 18. The forward portions of members 14, 16 extend upwardly and are interconnected at the forward ends by a tubular support 20. The rearward portion of members 14, 16 are also angled upwardly and are interconnected at the rearward ends by a second tubular support 22.

A platform 24 is provided to support the operator of the scooter in a standing position. The platform 24 is constructed of sheet metal and has longitudinally extending ribs 26 to engage the soles of the operator's shoes to prevent the operator from slipping off the scooter. The platform 24 is located directly beneath the frame 12. Sufficient surface area is provided to the left and right of the frame to comfortably receive the feet of the operator. Triangularly shaped portions 28, 30 are bent upwardly at each end of the platform. A pair of openings is provided in each of the portions 28, 30 through which the frame members 14, 16 extend to thereby secure the platform to the frame. The platform may be firmly mounted in place as by welding.

A front wheel 32 and a rear wheel 34 are rotatably mounted in suitable structure which will hereinafter be more fully described for rolling engagement with the ground surface 54. The mounting structure for the wheels is, in turn pivotally mounted in the tabular supports 20, 22 to permit independent turning of each of the wheels about an axis defined by the center lines of the supports 20, 22. It will be noted that the front tubular support 20 is angled rearwardly while the rear tubular support 22 is angled slightly forwardly. The angle of the rear tubular support 22 has particular significance in manipulation of the scooter.

The rear wheel 34 is rotatably mounted on an axle 36 which extends between the lower ends of a U-shaped wheel support 38. The legs of the support 38 extend on either side of the wheel 34 and upwardly and forwardly therefrom towards the tubular support 22. Spaced-apart support brackets 40, 42 are provided on the upper portion of the wheel support 38. The brackets 40, 42 extend over the upper and lower ends of the tubular support 22. As will be noted in FIG. 4, a bolt 44 extends through openings in the brackets 40, 42 and passes through the tubular support 22. A locknut 46 threadingly engages the lower end of the bolt 44 to thereby pivotally secure the wheel support 38 to the tubular support 22. A pair of bearing elements 48, 50 are provided in the ends of the tubular support 22 to facilitate the pivoting action.

Referring to FIG. 3, it will be noted that the longitudinal axis of the tubular support 22, when theoretically extended as represented by the dot-dash line 52, intersects the ground surface 54 at a point forwardly of the contact point 56 of the rear wheel 34. This geometry has been found to be of importance in connection with operation of the scooter 10. In one operating embodiment of the scooter, the desired distance between the intersection points has been found to be about 4 inches. This distance may be varied resulting in varying characteristics of the scooter. However, it has been found that it is undesirable to have the intersection of the line 52 with the ground surface at a point rearwardly of the point 56 at which the wheel 34 touches the ground surface.

The support structure for the front wheel 32 includes a fork member 58 having a pair of arms 60, 62 extending around the front wheel 32 into connection with an axle 64 upon which the front wheel 32 is rotatably mounted. The lower portions of arms 60, 62 extend upwardly and rearwardly at an angle generally parallel to the tubular support 20. A pair of spaced-apart support brackets 66, 68 extends from the arms 60, 62. A bolt 70 extends through openings in the brackets 66, 68 and through the tubular support 20. The bolt 70 is journaled within the tubular support 20 in the manner described in connection with FIG. 4. The upper portions 72, 74 of the arms 60, 62 are directed first substantially vertically and are then spread apart and turned rearwardly at the upper ends thereof to provide a handlebar structure for the operator of the scooter. A transverse support bar 76 is provided intermediate the upper and lower ends of the arms 60, 62.

Operation of the scooter 10 may now be understood by reference to FIGS. 5–8. FIG. 5 illustrates turning of the vehicle to the operator's left. In FIG. 5, both the front wheel 32 and rear wheel 34 are turned in the desired direction of turn. This provides a very short turning radius permitting the scooter to be manipulated on an inclined surface in a manner simulating the slalom tactics utilized by a snow-skier The front wheel 32 is manually turned by means of the handlebars in direct response to the operator's wishes in a manner similar to that of conventional scooters or other wheeled vehicles. However, the rear wheel 34 responses to transverse angular movement of the tubular support 22 and will turn either to the right or left in response to right or left tilting of the support 22. When the operator shifts his weight causing the platform 24 to be tilted to the right as illustrated in FIG. 8, the tubular support 22 will be caused to tilt to the right resulting in the rear wheel 34 turning to the right as illustrated in FIG. 5. With the front wheel 32 manually turned to the left, the scooter 10 will sharply turn in the direction of the arrow 78.

Conversely, when the operator shifts his weight so as to cause the platform 24 to tilt to the left as illustrated in FIG. 7, the tubular support 22 will be tilted to the left resulting in the rear wheel 34 turning to the left as shown in FIG. 6. If the operator should decide to turn to the right in a manner the reverse of FIG. 5, he merely turns the front wheel 32 to the right to result in a turn the reverse of FIG. 5. However, FIG. 6 illustrates a situation in which the operator has turned the front wheel to the left. This results in rectilinear motion as illustrated by the arrow 80. This permits the operator to go substantially sidewardly down an incline. Similar sideward movement is, of course, possible with the rear wheel turned to the right as illustrated in FIG. 5 and the front wheel also turned to the right.

The turning of the rear wheel in the direction of tilt of the platform 24 is the reverse of structures known in the past. In previous structures, the rear wheel has turned in the opposite direction of tilt of the platform. The turning action of the rear wheel 34 is dependent upon the angle of the axis of the tubular support 22 with respect to the vertical and the point at which this axis intersects the ground surface. Preferably, the axis is angled forwardly about 10° from the vertical. Angular displacement of the axis forwardly from this position results in sluggish reaction of the rear wheel 34 and decreased turning sharpness. Angular displacement of the axis rearwardly from this position, i.e., closer to the vertical, results in increased maneuverability but decreased stability. The direction of turn of the rear wheel 34 is due to the fact that the axis of the tubular support 22 is angled upwardly and forwardly. This turning action permits the sideward motion of the scooter shown in FIG. 6 which has not been previously possible. Additionally, turning as in FIG. 5 is much sharper than has been possible with previous designs. Another feature of the geometry of the rear wheel structure is that by locating the point of intersection with the ground surface of the pivot axis of the tubular support 22 forwardly of the point 56 of engagement of the wheel 34 with the ground surface results in increased stability in operation of the scooter. The wheel tends to travel underneath the scooter thus improving stability. By providing a distance between the points of intersection of the wheels and axis of 4 inches, wobble and whiplash of the rear wheel are considerably reduced thus providing increased stability of the device. The point of intersection of the axis of the support 22 may be moved forwardly or rearwardly from the position shown. Movement of the axis forwardly does not appear to measurably affect the turning action. However, movement of the axis rearwardly tends to decrease stability. In no case should the point of intersection of the axis of the tubular support 22 with the ground be considerably rearwardly of the point of touching of the wheel 34 on the ground.

It will be appreciated that modifications of the present invention may be made without departing from the spirit and scope of the invention. For example, the scooter 10 may be motorized so that it may be driven without depending on the gravity of an inclined surface or foot power of the operator. Further, the front wheel 32 may be directly linked to the rear wheel 34 so that the rear wheel will turn in response to the turning of the front wheel rather than in response to the turning of the front wheel rather than in response to tilting of the platform 24. Such a linkage may be desirable in the event of use of a motor in order to provide greater stability when traveling at higher speeds in instances where the scooter is used as a means for transportation rather than as a sporting device.

What I claim as my invention is:

1. A scooter comprising a frame including structure to support an operator, said scooter including running gear consisting of front and rear wheel support structures, front ground-engaging wheel means rotatably mounted on the front wheel support structure, rear ground-engaging wheel means rotatably mounted on the rear wheel support structure, first means pivotally mounting said front wheel support structure on the frame, grippable means for manually turning the front wheel support structure, second means pivotally mounting said rear wheel support structure on the frame, the pivotal axis of said second means being angled upwardly and forwardly with respect to the scooter, the pivotal axis of said second means, when theoretically extended, intersecting the ground surface substantially at or in front of the point of contact of the rear wheel means with the ground surface, whereby the rear wheel means will turn in response to sideward tilting of the pivotal axis of said second means and in the same direction as said axis if tilted.

2. A scooter as defined in claim 1, and further characterized in that said rear ground-engaging wheel means consists of a single ground-engaging wheel.

3. A scooter as defined in claim 1, and further characterized in that said front ground-engaging wheel means consists of a single front ground-engaging wheel.

4. A scooter as defined in claim 1, and further characterized in that the pivotal axis of said second means lies in a generally vertical plane with respect to the ground surface when the scooter is in upright position.

5. A scooter as defined in claim 1, and further characterized in that the pivotal axis of said second means intersects the ground surface in front of the point of contact of the rear wheel means with the ground surface.

6. A scooter as defined in claim 1, and further characterized in that the longitudinal axis of the rear wheel support structure is angled forwardly with respect to the scooter but at an angle, with respect to the horizontal plane, less than the angle of said pivotal axis of said second means.

7. A scooter as defined in claim 1, and further characterized in that said structure to support an operator comprises a generally horizontally extending platform, portions of which extend on either side of the frame to permit the operator to stand thereon.

8. A scooter comprising a frame including structure to support an operator said scooter including running gear consisting of a front ground-engaging wheel means and a single rear ground-engaging wheel, first means mounting the front wheel on the frame for rotation about a generally transverse axis and for swinging movement about an upwardly directed axis, second means for mounting the rear wheel on the frame for rotation about a generally transverse axis and for swinging movement about an upwardly and forwardly directed pivotal axis, said last-mentioned pivotal axis, when theoretically extended, intersecting the ground surface substantially at or in front of the point of contact of the rear wheel with the ground surface whereby the rear wheel will turn in response to sideward tilting of said last-mentioned pivotal axis and in the same direction as the axis is tilted.

* * * * *